(12) United States Patent
Yanosy, Jr.

(10) Patent No.: US 7,571,149 B1
(45) Date of Patent: Aug. 4, 2009

(54) INFERENTIAL EVALUATION AND CONTROL FOR MATCHING REQUIREMENTS TO SYSTEM CAPABILITIES

(75) Inventor: John A. Yanosy, Jr., Grapevine, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 284 days.

(21) Appl. No.: 11/434,342

(22) Filed: May 15, 2006

(51) Int. Cl.
*G06N 7/02* (2006.01)
*G06F 9/44* (2006.01)

(52) U.S. Cl. .............................. 706/52; 709/204; 705/35

(58) Field of Classification Search .................. 706/52; 703/11; 707/200
See application file for complete search history.

(56) References Cited

U.S. PATENT DOCUMENTS

| | | | |
|---|---|---|---|
| 2005/0034107 A1* | 2/2005 | Kendall et al. | 717/136 |
| 2006/0242101 A1* | 10/2006 | Akkiraju et al. | 707/1 |
| 2007/0156420 A1* | 7/2007 | Meier et al. | 705/1 |

* cited by examiner

*Primary Examiner*—David R Vincent
*Assistant Examiner*—Kalpana Bharadwaj
(74) *Attorney, Agent, or Firm*—Daniel M. Barbieri

(57) ABSTRACT

An inferential evaluation system for evaluating system capabilities relative to a set of requirements is provided. The inferential evaluation system includes a requirements modeling component configurable to be updated to model a set of requirements. The inferential evaluation system also includes a system descriptive modeling component configurable to be updated to model a system description of a first system to be analyzed. An evaluation model component is also included and is configured to relate the system description of the first system to requirements of the set of requirements in order to evaluate the capabilities of the first system to meet the set of requirements.

4 Claims, 12 Drawing Sheets

INFERENTIAL EVALUATION AND CONTROL FOR MATCHING REQUIREMENTS TO SYSTEM CAPABILITIES

BACKGROUND

Currently in the design of communication networks, service oriented systems, and in systems with different inter-network and intra-network protocols, there is no easy method to ensure that the intent of a requirement is satisfied by a system attribute, nor is there any methodology or process which captures and represents within the implemented systems or networks themselves these relationships between requirements and capabilities. For example there are different applications and media with their own quality of service (QOS) requirements, which do not have their translations into network services with their QOS characteristics represented in the design models or the implemented systems themselves. As a consequence, there is a potential for mismatch between network QOS capabilities and the need for QOS at the application level when considering new network services or new applications, and especially in dynamic situations where the choices of network services with QOS to support an application changes with the characteristics of an ad hoc network or other restrictive network states.

Evaluating one or more systems to determine whether the system capabilities can satisfy a set of requirements is very difficult and the knowledge of this evaluation is typically lost or not easily accessible after the design process. Likewise, comparing systems to determine which is best suited to satisfy a set requirements in a consistent manner can also be very difficult without some form of common model representing the requirements and the analyzed system capabilities. Lacking the ability to evaluate system capabilities in a consistent manner relative to sets of requirements, much work is typically required to select the best system to use.

SUMMARY

There is a need to match requirements to system capabilities in a universal, easy and consistent manner that can be interpreted by the systems themselves during operation. Disclosed embodiments provide a universal evaluation model that matches the semantics of the requirements domain with the semantics of the system attributes in a logical fashion to allow for inferences to be made. The evaluation model is capable of containing complex restrictions on inferences and also of using and relating the vocabulary and language of the requirements domain and the system domain, thus providing a semantic translation between them from both their respective domain vocabularies for purposes of defining a satisfaction meaning between requirements and system capabilities.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 1-2 is a block diagram illustrating a computing environment configured to implement an embodiment of the inferential evaluation system.

FIG. 2 is a block diagram illustrating a more detailed embodiment of the inferential evaluation system.

DETAILED DESCRIPTION

It is desirable to match requirements to system capabilities in a universal, easy and consistent manner that can be interpreted by the systems themselves during operation. The ability to match system requirements to the capabilities of one or more systems in a consistent manner through use of common requirements models related to the specific models of systems to be evaluated for their potential to satisfy the system requirements is provided by disclosed embodiments of an inferential evaluation system.

Disclosed embodiments of an inferential evaluation system provide a universal solution for representing requirements and their attributes in any domain, about system capability properties and attributes, and about the logical relationships between system capability properties and attributes, and domain requirements and attributes respectively. This enables logical inferences to be made concerning the satisfaction of higher level domain requirements and which system capability attributes and properties satisfy them and also to characterize the type of satisfaction attained. The solution is based on an evaluation ontology that incorporates these three types of knowledge and a logical language for expressing relationships between them. An ontology is defined as a specification of a conceptualization of a knowledge domain. More specifically, an ontology is a controlled model and vocabulary that describes objects and the relations between them in a formal way, and has a grammar for using the vocabulary terms and making well formed statements to express something meaningful within a specified domain of interest. The set of well formed expressions in the ontology are also useful for creating queries and assertions. Ontological commitments by programs and the evaluation subsystems are agreements to use the vocabulary and model in a consistent way for knowledge sharing.

Figure 1:
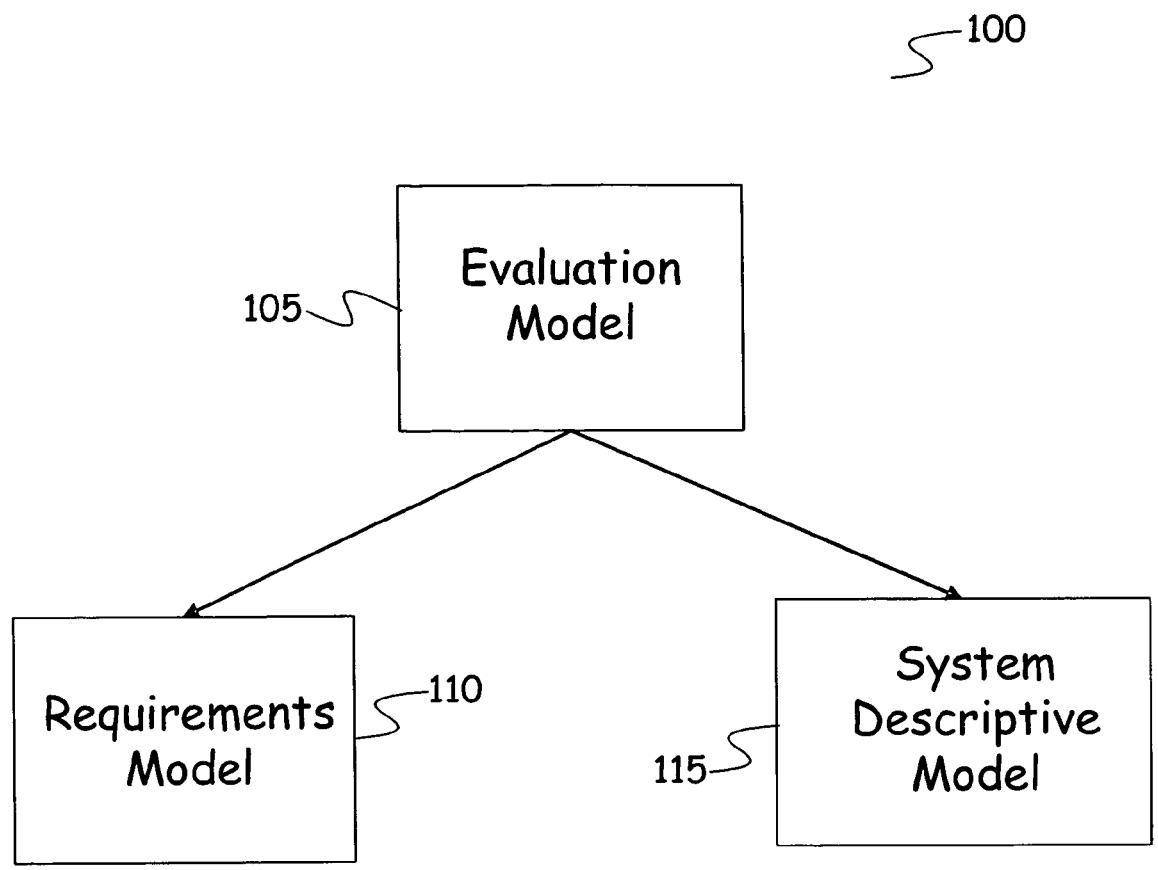
FIGS. 1-1 is a block diagram illustrating an embodiment of an inferential evaluation system.

The three types of knowledge incorporated into the evaluation system in exemplary embodiments are Requirements Model, System Descriptive Model, and Evaluation Model. FIGS. 1-1 is a high level representation of an architecture model of an embodiment of the inferential evaluation system 100. Inferential evaluation system 100 includes an evaluation model 105, a requirements model 110 and one or more system capabilities or descriptive models 115. Evaluation model 105 provides the linkage between the requirements model 110 and the system descriptive model 115 for purposes of evaluation of the system represented by system descriptive model 115 to identify its capabilities potential to satisfy the set of requirements.

In some embodiments, requirements model 110 describes Net Centric (e.g. Internet based architectures) requirements to be satisfied by a system such as the system described by system descriptive model 115. As such, requirements model 110 identifies requirement attributes. In some embodiments, requirements model 110 uses standard Network Centric Operations (NCO) vocabulary and concepts to accomplish this description. System descriptive model 115 describes a system being evaluated. As such, system descriptive model 115 identifies system attributes, using the vocabulary and concepts of the system. More than one system descriptive model can be used to describe more than one system, allowing system capabilities of multiple systems to be evaluated and compared. Much of the remainder of the disclosure describes embodiments in terms of a single system descriptive model, but those of skill in the art will recognize that the description is applicable to multiple descriptive model embodiments.

In one example instance use, evaluation model 105 captures or generates a system Net Centric evaluation for the system described by model 115. As such, evaluation model 105 relates the system description with the requirements. It identifies system attributes from system descriptive model 115 related to requirement attributes from model 110. Evaluation model 105 also relates vocabulary and concepts of the system under evaluation (i.e., from model 115) with the vocabulary and concepts of the requirements (i.e., from model 110).

The overall ontology is defined using the OWL ontology language, but any other equivalent could also be used to represent the three domain models, 105, 110, and 115, that can be used to model the hierarchical requirements characteristics and the hierarchical system characteristics, and an evaluative model relating the two in such a manner that inferences can be made concerning the satisfaction of higher level requirements by any level of system characteristics. The Web Ontology Language, known as "OWL", is a semantic markup language for publishing and sharing ontologies on the World Wide Web. OWL was developed as a vocabulary extension of RDF (the Resource Description Framework), and is known in the art and is described here as one form of language used to represent the semantics of the three domain models previously identified Disclosed embodiments are built on an ontology with three abstraction layers in each of the three knowledge areas. The evaluation logic includes logic to associate and restrict what inferences can be drawn at higher layers in the requirements model from lower layer satisfaction matches. The ontology itself can also be used as a building block to create even higher layers of inferences in ontologies of lower layers, thus providing the means to evaluate different aspects of a requirement satisfaction, e.g., performance, functionality, QOS, etc.

Figures 1, 2:
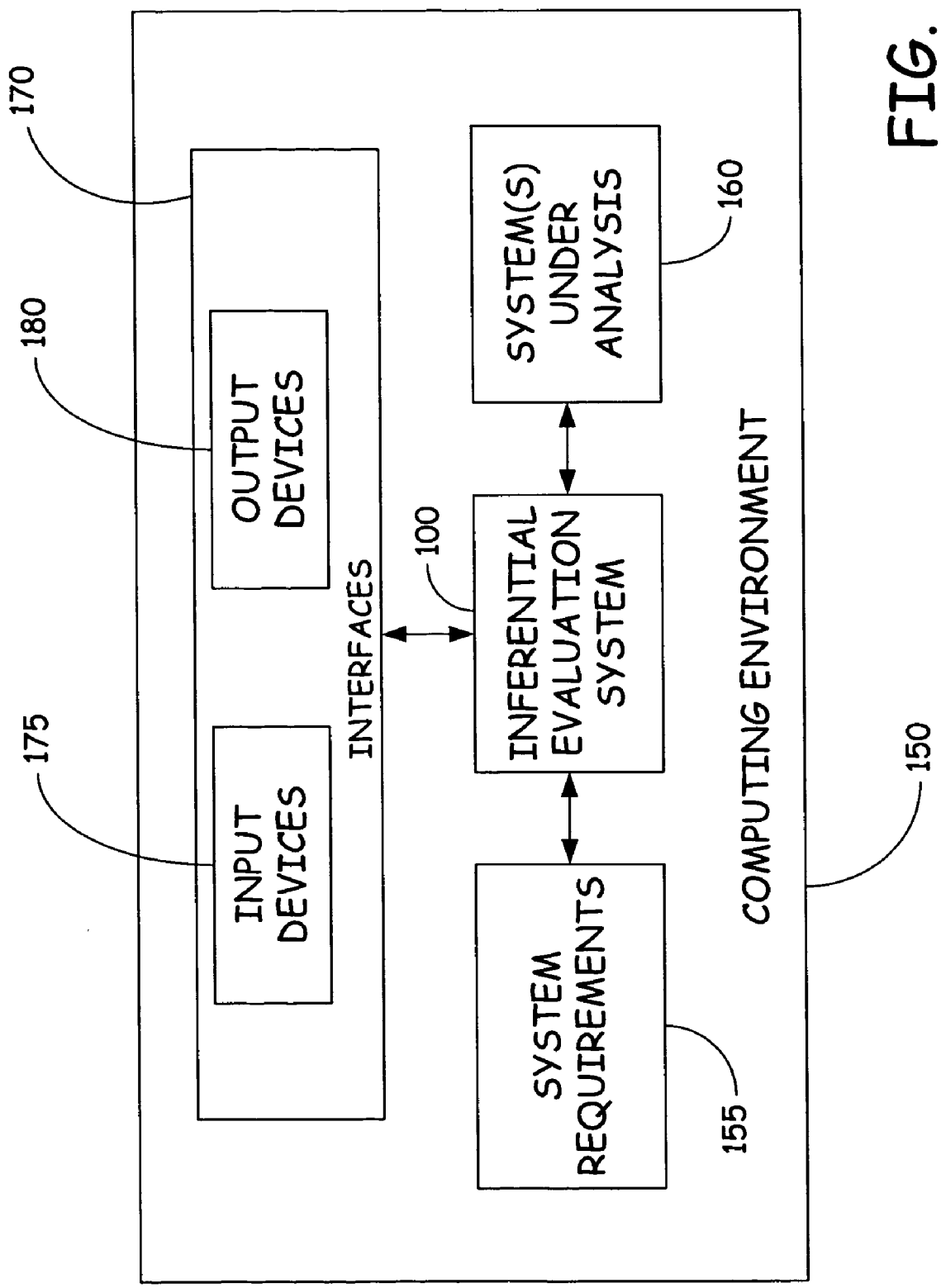
Figure 2:
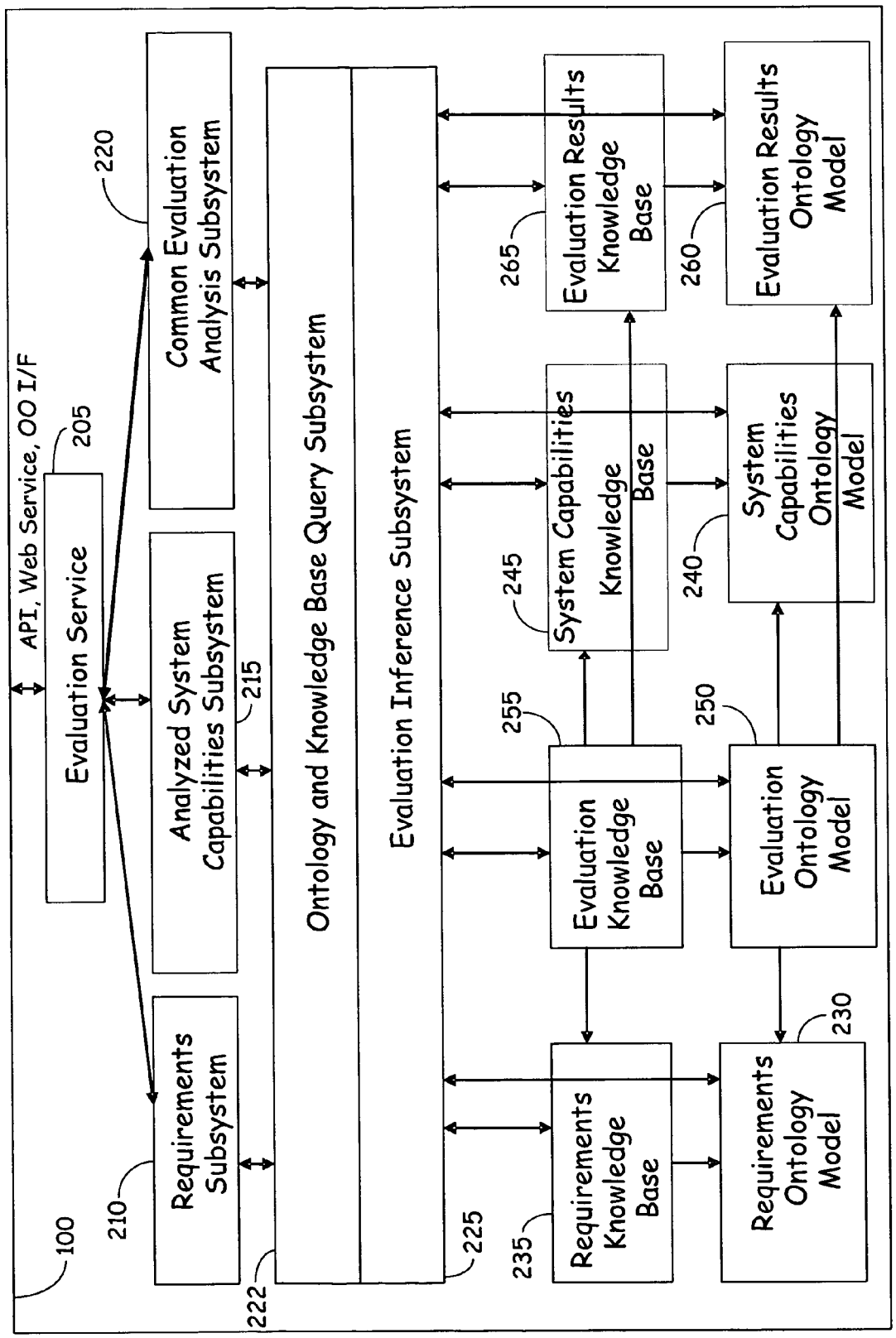

FIGS. 1-2 illustrates a computing environment 150 in which inferential evaluation system 100 can be implemented. Computing environment 150 therefore represents computing hardware such as personal computers, server computers, networked computers, etc which utilize microprocessors or other processing circuitry to implement the inferential evaluation system. Computing environment 150 also represents application programs and computer-readable medium which contain or store computer-executable instructions which, when executed by processing circuitry, implement aspects of the inferential evaluation system. Computing environment 150 also includes interface devices 170, such as input devices 175 and output devices 180. The interface devices can be human interfaces, with input devices 175 such as a keyboard, a mouse or other pointing devices, speech input devices, etc., and with output devices 180 such as displays, printers, etc. Interface devices 170 can also be interfaces to other computing environments or hardware.

FIGS. 1-2 illustrates inferential evaluation system 100 interfacing between a set of system requirements 155 and a one or more systems 160 under analysis. System requirements 155 and the one or more systems 160 under analysis by inferential evaluation system 100 can be running or exist on the same computing environment 150 as system 100, but this need not be the case. Instead, information about the requirements and the system capabilities can be provided to evaluation system 100 through interfaces 170.

Referring now to FIG. 2, shown is a block diagram illustrating one more particular embodiment of the architecture of inferential evaluation system 100. As shown in FIG. 2, this embodiment of inferential evaluation system 100 includes a number of components labeled as services, subsystems, knowledge bases and ontology models. These are described below.

Evaluation service 205 provides primary control and access to the overall inferential evaluation system 100. Evaluation service 205 also provides interfaces for integration with other software frameworks, either web service interface, object oriented interface, or a common message based application programming interface (API). Requirements subsystem 210 is configured to provide services supporting requirements knowledge capture, creation of requirements hierarchy dependencies, and parameter settings for specific requirements needs classification. Analyzed system capabilities subsystem 215 is configured to provide services supporting analyzed system capabilities knowledge capture, creation of system capabilities hierarchy dependencies, and parameter settings for specific capabilities needs classification.

Common evaluation analysis subsystem 220 is configured to provide services supporting creation of fixed logical relationships between requirements and system capabilities models using a common evaluation language specified by an evaluation ontology. Subsystem 220 supports multiple satisfaction classifications between requirements and system capabilities at three hierarchical levels: Aspect, Attribute and Element. Subsystem 220 also supports multiple types of satisfaction classifications including: Satisfied, Partially Satisfied, and Not Satisfied, and Not Applicable.

Ontology and knowledge base query subsystem 222 is configured to provide services supporting access to four pairs of knowledge bases and ontologies (Requirements, System Capabilities, Evaluation, and Evaluation Results), which are described below in greater detail. Evaluation inference subsystem 225 is configured to implement logic inference capabilities to match the OWL language or equivalent logical inferences that can be made for a query. Subsystem 225 also supports automatic consistency checks for satisfaction classification types.

In an exemplary embodiment, requirements ontology model 230 is a semantic ontology in W3C OWL language or equivalent enabling capture of requirements in a hierarchical semantic dependency model (requirements Aspect, requirements Element, Requirements Attribute). Requirements ontology model 230 has predefined requirement concepts which can be refined with new domain specific requirements concepts. Requirements knowledge base 235 stores a set of facts entered about a requirements application domain, which are consistent with the requirements ontology 230 to ensure a consistent knowledge base and inferences.

In this exemplary embodiment, analyzed system capabilities ontology model 240 is a semantic ontology in W3C OWL language or equivalent enabling capture of relevant analyzed system capabilities in a hierarchical semantic dependency model (Analyzed Aspect, Analyzed Element, Analyzed Attribute). System capabilities ontology model 240 has predefined analyzed system capabilities concepts which can be refined with new system specific capabilities concepts. Analyzed system capabilities knowledge base 245 stores a set of facts entered about the relevant analyzed system capabilities consistent with the analyzed system capabilities ontology

240. Certain constraints are defined by the ontology to ensure a consistent knowledge base and inferences. Different analyzed system knowledge bases can be created, each consistent with the analyzed system ontology for comparison purposes.

In this exemplary embodiment, evaluation ontology model 250 is a semantic ontology in W3C OWL language or equivalent enabling semantic linkage between requirements and analyzed system capabilities knowledge bases 235 and 245. The evaluation ontology 250 has a set of properties and concept classifications that can be refined for the specific application domain. Each evaluation concept has at least one concept classification of both the requirements and analyzed system ontologies 230 and 240. The model 250 also links the satisfaction concept classification to each linkage relationship, thus characterizing the satisfaction of a requirement state by an analyzed system capability. The evaluation concept parallels the requirements and analyzed system hierarchy ontology models 230 and 240, though they are not necessarily one-to-one, in a hierarchical semantic dependency model (Evaluation Aspect, Evaluation Element, Evaluation Attribute). Each evaluation model concept has a property linking to at least one requirement and analyzed system concept. For similar types of analyzed systems the same ontology is used to create different evaluations of different systems. Evaluation knowledge base 255 stores a set of facts entered about a semantic logical linkage between at least one requirements concept and an analyzed system concept. In some embodiments, ideally they are at the same hierarchical level in the model 250, though this is not necessary. The set of facts also define the type of satisfaction linkage, partial, satisfied, not-satisfied, or not applicable.

Evaluation results ontology model 260 is a semantic ontology in W3C OWL language or equivalent aggregating satisfaction results between requirements and analyzed system capabilities by type. Evaluation results knowledge base 265 stores a set of facts derived from the evaluation knowledge based structured by satisfaction types.

In order for a user or a system to interact with inferential evaluation system 100 for purposes of evaluating a particular system's capabilities to satisfy a set of requirements, the interaction will be initiated through evaluation service component 205, which as was described above, can be an API, a web service, an object based interface, etc. In order to update inferential evaluation system 100 for use in evaluating system capabilities relative to the particular requirements, the specific languages and model for the requirements are updated under control of the requirements subsystem 210 under requests through the external interface of evaluation service 205. In other words, requirements ontology model 230 is updated with new requirements concepts. Using evaluation service component 205, interactions with the evaluation system 100 and the requirements subsystem 210 can occur to modify or add vocabulary or concept definitions of the requirements ontology model. Requirements subsystem 210 is committed to the requirements ontology by supporting interactions for defining requirements knowledge capture in the model, creating requirements hierarchy dependencies, and for defining parameter settings for specific requirements needs classification. The requirements ontology model 230 defines the vocabulary of requirements, the grammar of requirements, the structural and logical relationships for the model, and the types of logical inferences that can be made from the model. The requirements knowledge base 235 contains a set of requirements facts that are consistent with the vocabulary, grammar and model defined by the requirements ontology model 230.

Ontology and knowledge base query subsystem 222 provides access to the ontology model 230 or the requirements knowledge base 235 with information provided by the requirements subsystem 210 in order to change the model or to add or modify the facts in the requirements knowledge base.

Knowledge base 235 is updated with the actual specific environment type facts as an instance of the meta description constrained by the requirements ontology 230. The ontology 230 is a model comprising multiple classes, with the various logical constraints on them. When the requirements knowledge base 235 is updated, it is done with the vocabulary, concepts and allowed expression types of the particular requirements domain defined by the ontology 230. For example, for communication system requirements, communications concepts and names would be used that are subclasses of common ones that are universal and invariant. So, for a requirements update, determination of the particular subsystem to invoke is initiated through the evaluation service 205, which would then route subsequent related messages for the requirements modification to the requirements subsystem 210 for subsequent requirements ontology, knowledge base access. The requirements subsystem 210 then controls whether to update the ontology 230 or the knowledge base 235, and passes the query to the appropriate knowledge base or ontology model.

Also in order to update inferential evaluation system 100 for use in evaluating system capabilities relative to the particular requirements, the knowledge about specific system capabilities are updated for the system being analyzed. In other words, system capabilities ontology model 240 and knowledge base 245 are updated under control of subsystem 215. Using evaluation service component 205 again to determine which subsystem to invoke, the interactions to modify the vocabulary, concepts of system capabilities model 240 definitions, or to add facts to the system capabilities knowledge base 245 are coordinated with the analyzed system capabilities subsystem 215. Subsystem 215 supports this system capabilities knowledge capture, creation of system capabilities hierarchy dependencies, and parameter settings for specific capabilities needs classification. System capabilities subsystem 215 then updates system capabilities ontology model 240 or system capabilities knowledge base 245 through the ontology and knowledge base query subsystem 222. System Capabilities Knowledge base 245 is updated with the actual specific facts as an instance of the meta description inside the ontology 240, or in other words only facts consistent with the system capabilities ontology 240 vocabulary, grammar, allowed expressions, and model are allowed.

Once requirements ontology model 230 and requirements knowledge base 235, and/or system capabilities ontology model 240 and system capabilities knowledge base 245, are updated, the evaluation of the system capabilities relative to the requirements is performed. Prior to this evaluation though, the evaluation ontology model 250 must first be defined to relate the requirements model definitions to the system capabilities model definitions, which can then permit a set of requirements satisfaction facts to be entered into the evaluation knowledge base 255 to characterize a particular system's satisfaction of requirements. Common evaluation analysis subsystem 220 will have directed interactions routed to it from the evaluation service interface 205, for either evaluation queries, evaluation ontology model updates, or evaluation knowledge base updates.

Under the control of common evaluation analysis subsystem 220 in response to a query received through evaluation service 205, evaluation inference subsystem 225 checks for defined matches between requirements ontology model 230/requirements knowledge base 235 and system capabilities ontology model 240/system capabilities knowledge base 245 as defined by the evaluation ontology model 250 and the evaluation knowledge base 255. Evaluation inference subsystem 225 is a logic inference engine that checks the match between the query and the actual knowledge base or ontology to see if there is a match. It also has logic to determine if there is any transitive inference (something like "if A is related to B and B is related to C, then A is related to C"), i.e., other logical paths through the model 250 that would satisfy the query. Evaluation inference subsystem 225 is a rules based inference engine, and any of the numerous rules based inference engines which are publicly available can be used. Evaluation inference subsystem 225 thus does complex matching between the language of the query, which can be constructed as an OWL query, and the language of the system as defined by the appropriate ontology model, either requirements, system capabilities, or evaluation ontology 230, 240 or 250 respectively.

An important concept is that in order to represent requirements satisfaction facts about a particular system and to be able to query whether a system satisfies various requirements the following has to be done:

1. The requirements vocabulary, allowed expressions and overall model constraints must be defined by refining and specializing the general requirements ontology model 230;
2. The system capabilities vocabulary, allowed expression and overall model constraints must be defined by refining and specializing the general system capabilities ontology model 240;
3. The allowed satisfaction relationships must be defined between the requirements ontology model 230 and the system capabilities ontology model 240 through the refinement and specialization of the evaluation ontology model 250;
4. The actual requirements facts must be entered into the requirements knowledge base 235 that are consistent with the requirement ontology model 230;
5. The actual system capability facts must be entered into the system capabilities knowledge base 245;
6. The actual evaluation satisfaction facts characterizing the relationship between the requirements facts in 235 and the system capabilities facts knowledge base 245 must be entered into the evaluation knowledge base 255;
7. The evaluation service 205 provide the common interface to external applications to the three internal subsystems coordinating queries and updates to the three types of knowledge;
8. The requirements subsystem 210 is committed to the requirements ontology 230 and supports interactions to query and modify both the requirements ontology 230 and its associated knowledge base 235;
9. The system capabilities subsystem 215 is committed to the system capabilities ontology 240 and supports interactions to query and modify both the system capabilities ontology 240 and its associated knowledge base 245;
10. The evaluation subsystem 220 is committed to the evaluation ontology 250 and supports interactions to query and modify both the requirements ontology 250 and its associated knowledge base 255;
11. The ontology and knowledge base query subsystem 222 supports interactions with all ontologies and knowledge bases system; and
12. The evaluation inference subsystem 225 supports logical inferences and matching of queries against knowledge contained in either the ontologies or the knowledge bases.

Figure 3:
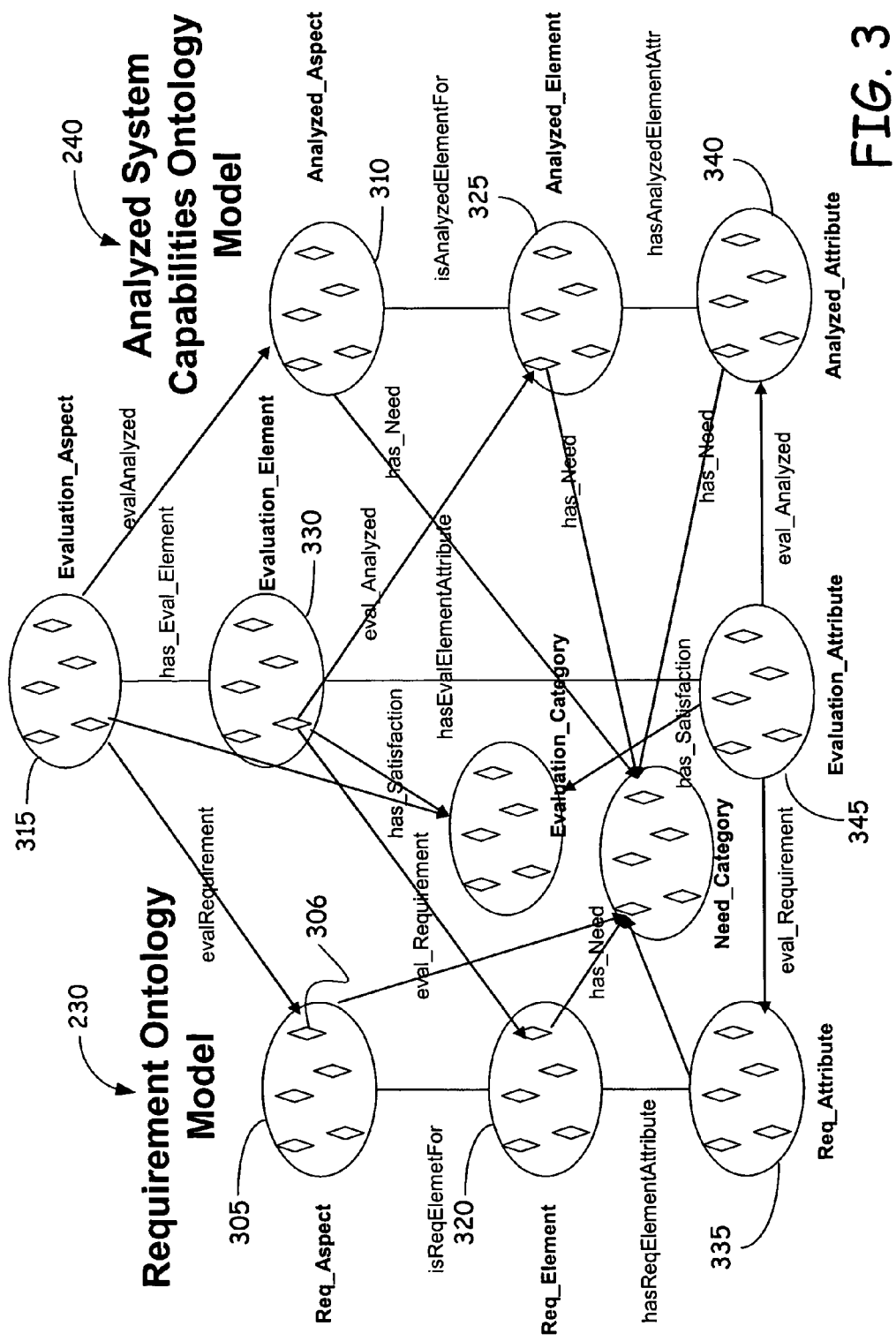
FIG. 3 is a diagram illustrating an example of an evaluation ontology model.

FIG. 3 is a diagrammatic illustration of an example embodiment of evaluation ontology model 250 linking requirements ontology model 230 and analyzed system capabilities ontology model 240. The illustration shown in FIG. 3 is provided for purposes of demonstration only, and not to limit disclosed embodiments to this particular ontology. FIG. 3 illustrates satisfaction classifications between requirements and system capabilities at three hierarchical levels, Aspect, Element and Attribute. Note the mapping or linking of a requirement aspect Req_Aspect 305 of requirement ontology model 230 to an analyzed aspect Analyzed_Aspect 310 of capabilities ontology model 240 through an evaluation aspect Evaluation_Aspect 315 of evaluation ontology model 250. This mapping defines the relationships between different requirements aspects and system capabilities aspects through a concept called evaluation aspect. Similarly, evaluation element 330 of evaluation ontology model 250 links the requirement element Req_Element 320 of model 230 to the analyzed element Analyzed_Element 325 in capabilities ontology model 240 which satisfies the requirement. Also, evaluation attribute Evaluation_Attribute 345 links the requirement attribute Req_Attribute 335 with the analyzed attribute Analyzed_Attribute 340 from system capabilities model 240 which satisfies the requirement attribute. The diamond symbols (e.g., as shown at 306) within each aspect, element or attribute concept represent specific named instances of that concept class, thus the above mapping relationships define which sets of system capabilities are related to satisfaction of sets of requirements through named instances of evaluation aspects, elements or attributes.

FIGS. 4-7 are representations of portions of screen shots of a typical ontology editing tool, which illustrates the type of information which can be displayed on an output device 180 as shown in FIGS. 1-2 for purposes of entering, analyzing, confirming, or otherwise using the various layers of models 105/110/115 (FIGS. 1-1) or models 230/240/250/260 (FIG. 2) in a process of defining and evaluating the capabilities of a system to meet a set of requirements. The key elements illustrated are the defined common concepts Evaluation Results, Model, Model Layers, Aspect Layer, Attribute Layer, Element Layer, the Value Partition, the Evaluation Category and the Need Category, and the logical assertions for each concept or class defining the necessary or necessary and sufficient conditions for a named instance to be a member of a knowledge base consistent with this ontology.

Figure 4:
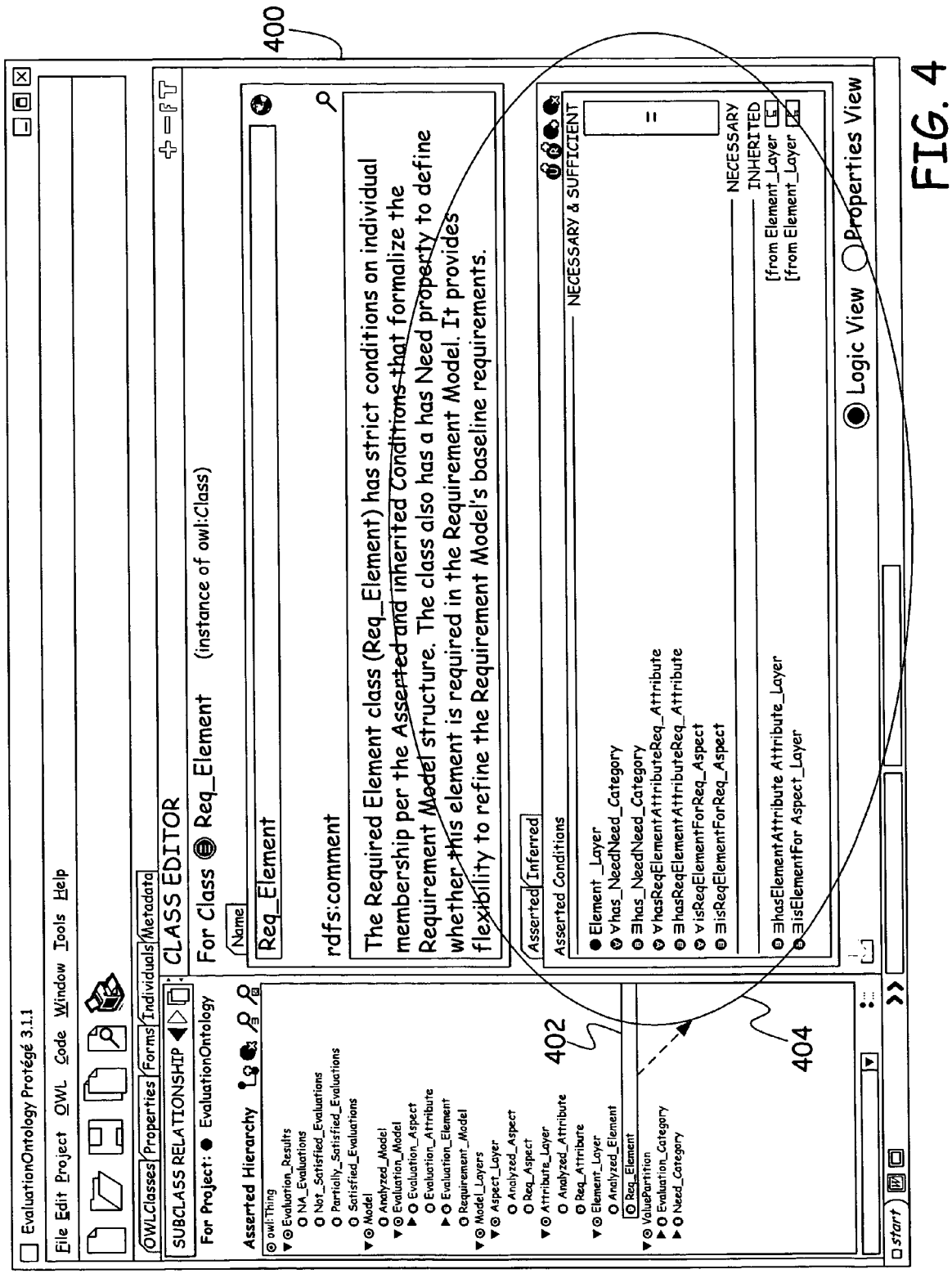
FIGS. 4-7 are representations of portions of screen shots illustrating examples of logical assertions used to define necessary and sufficient conditions for membership in classes of the ontology models.

FIG. 4 illustrates a representation of screen shot 400 which shows the asserted conditions 404 of the required element Req_Element class 402 of the Req_element layer, or the previously identified Requirement Element concept. These are the logical assertions which define necessary and sufficient conditions for individual membership in the Req_Element class. As shown, this required element class has strict conditions on individual membership per the asserted and inherited conditions that formalize the requirement model structure. The class also has a "hasNeed" property to define whether this element is required in the requirement model. This provides flexibility to refine the requirement model's baseline requirements.

Figure 5:
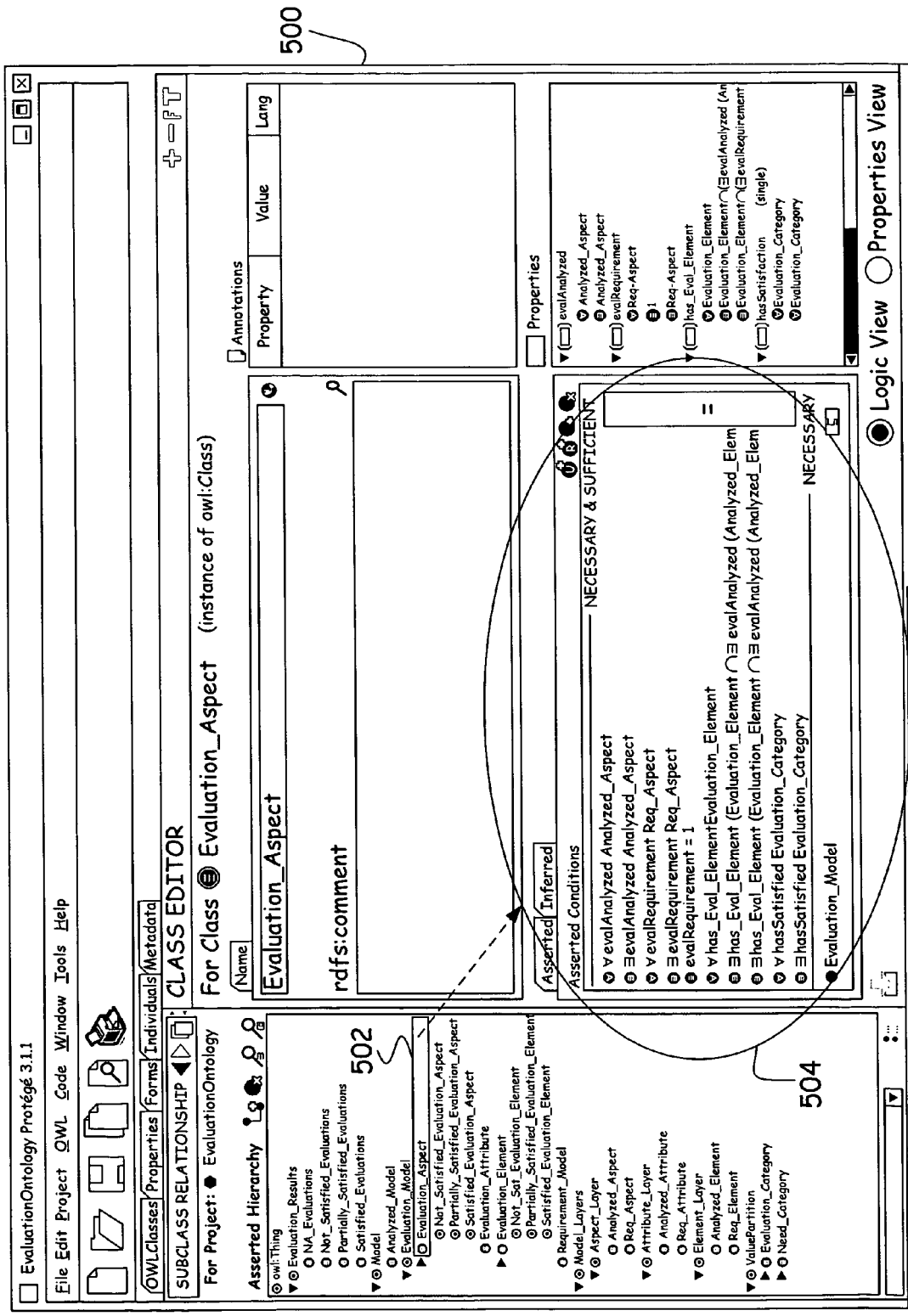

FIG. 5 illustrates a representation of a screen shot 500 which shows the logical assertions 504 which define necessary and sufficient conditions for individual membership in the Evaluation_Aspect class 502 of the evaluation model. Note the defined assertions between Analyzed_Aspect and Req_Aspect, and also the assertion about the existence of an Evaluation_Category to be assigned to the Evaluation_Aspect through the hasSatisfaction property. This assertion enables and requires that each evaluation instance have an assigned Evaluation_Category instance of type either Not_Satisfied, Partially_Satisfied or Satisfied.

Figure 6:
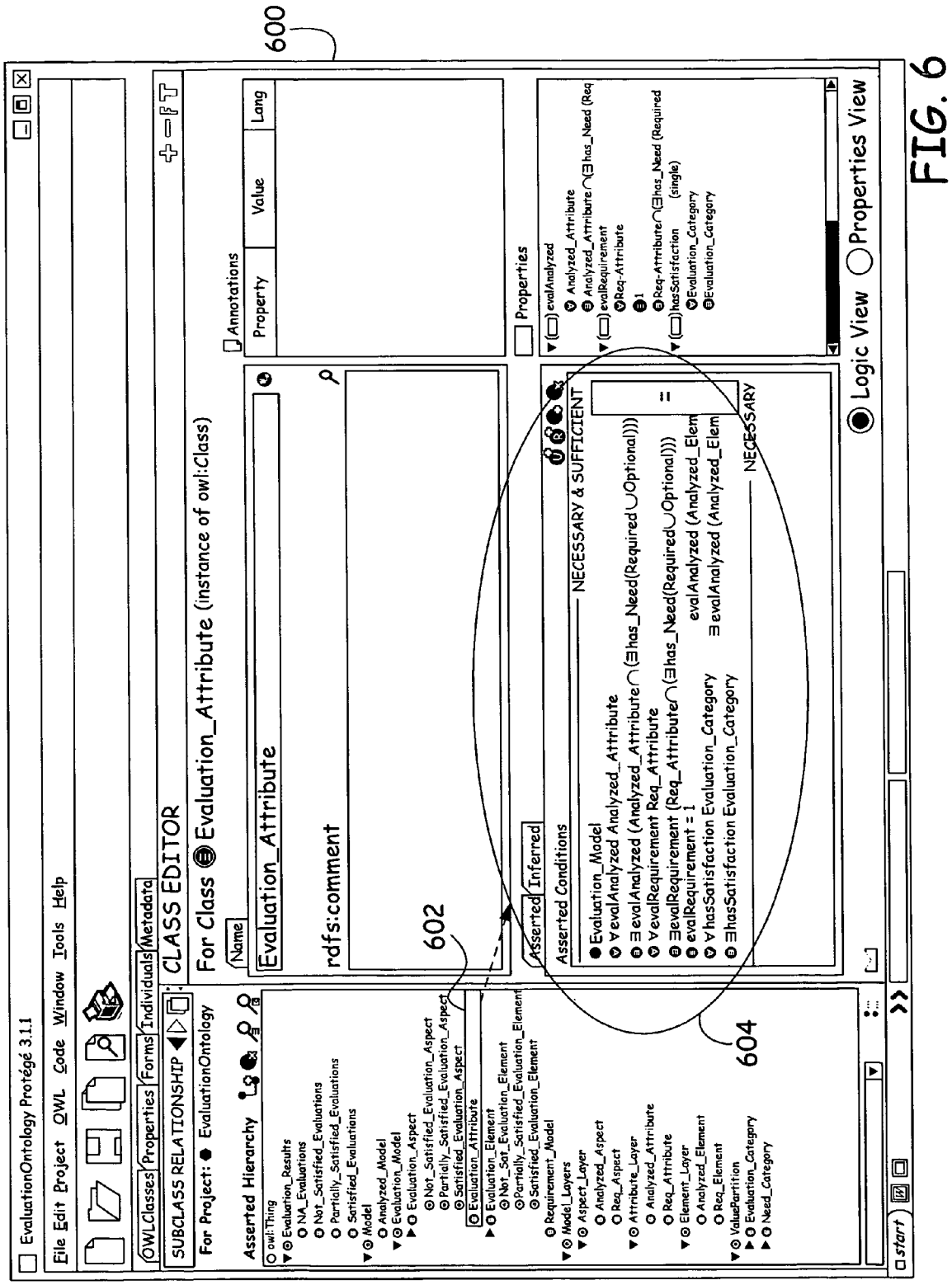
Figure 7:
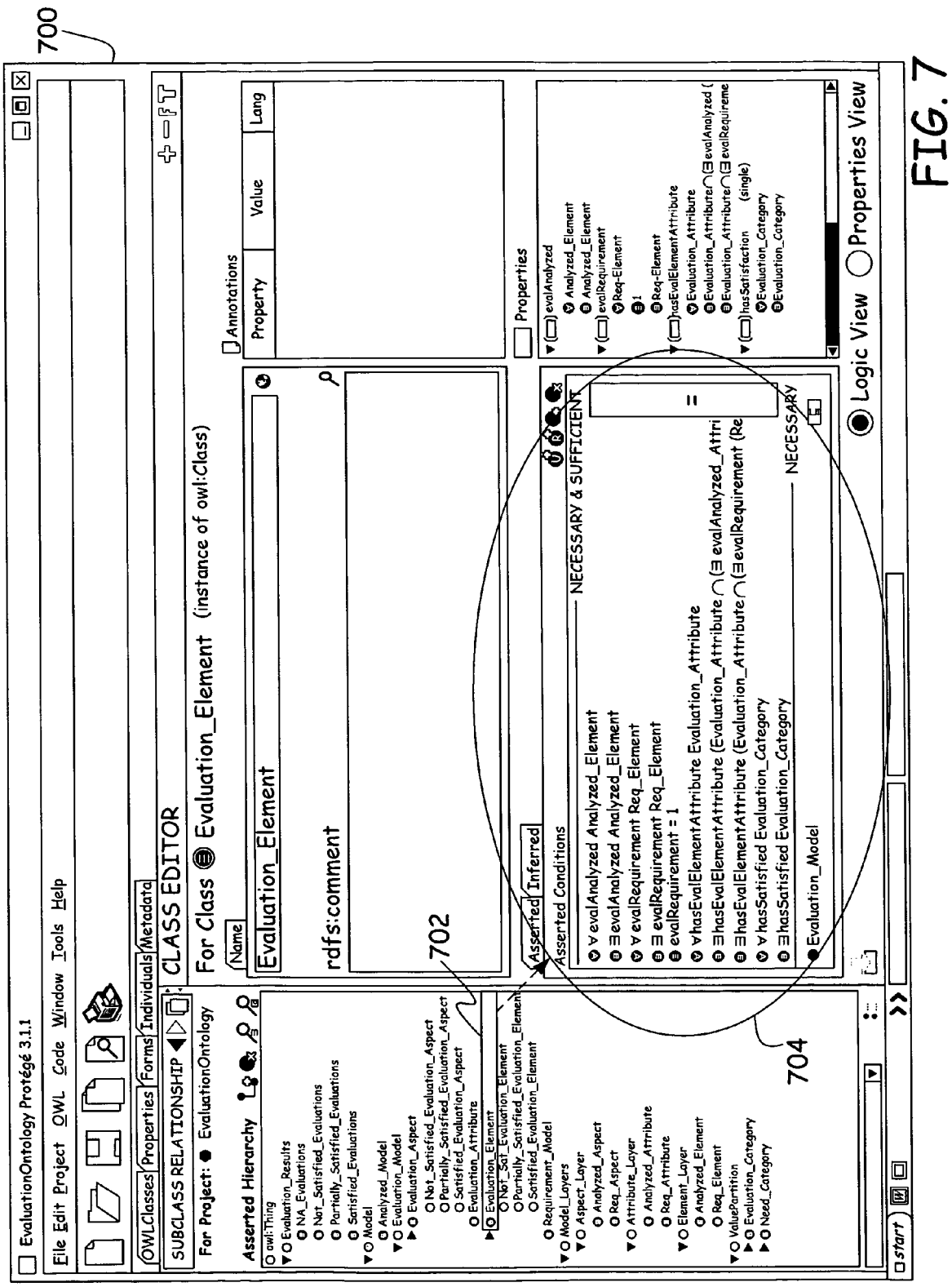

FIG. 6 in a similar fashion illustrates a representation of screen shot 600 which shows the logical assertions 604 which define necessary and sufficient conditions for individual membership in the Evaluation_Attribute class 602 of the evaluation model. FIG. 7 illustrates a representation of screen shot 700 which shows the logical assertions 704 which define necessary and sufficient conditions for individual membership in the Evaluation_Element class 702 of the evaluation model.

Figure 8:
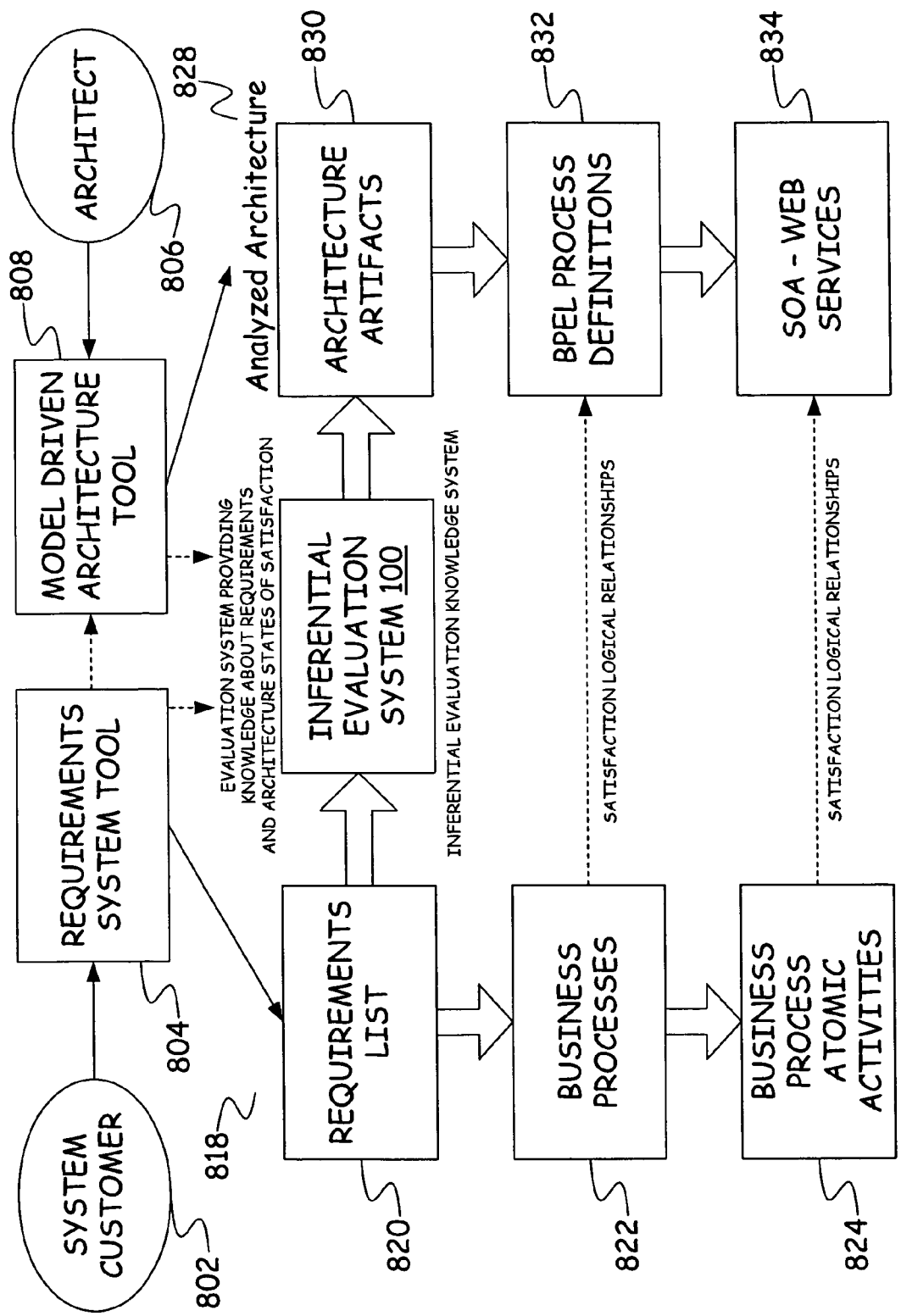
FIGS. 8-11 are block diagrams illustrating examples of systems which can use the inferential evaluation system of disclosed embodiments.
Figure 9:
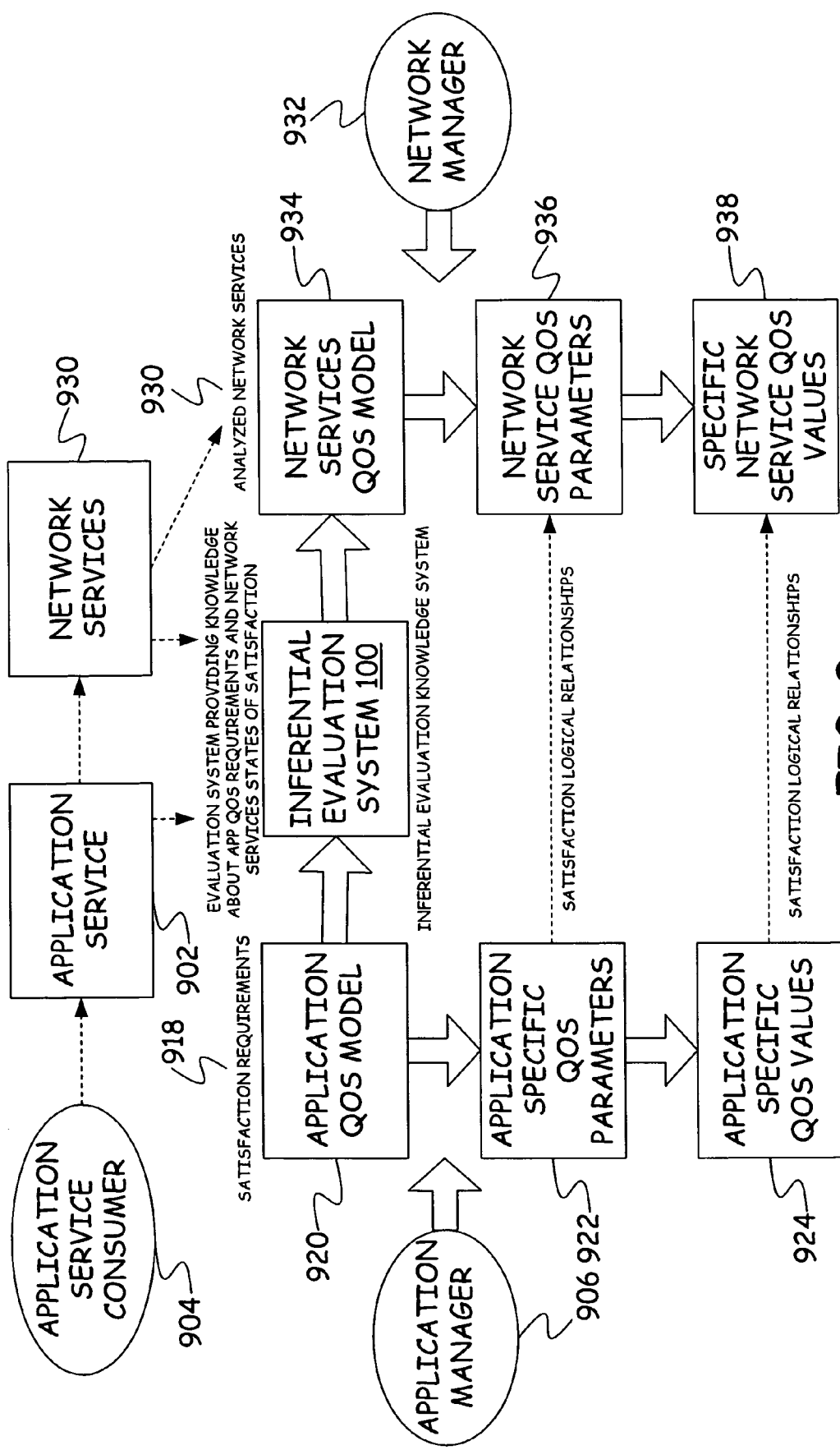
Figure 10:
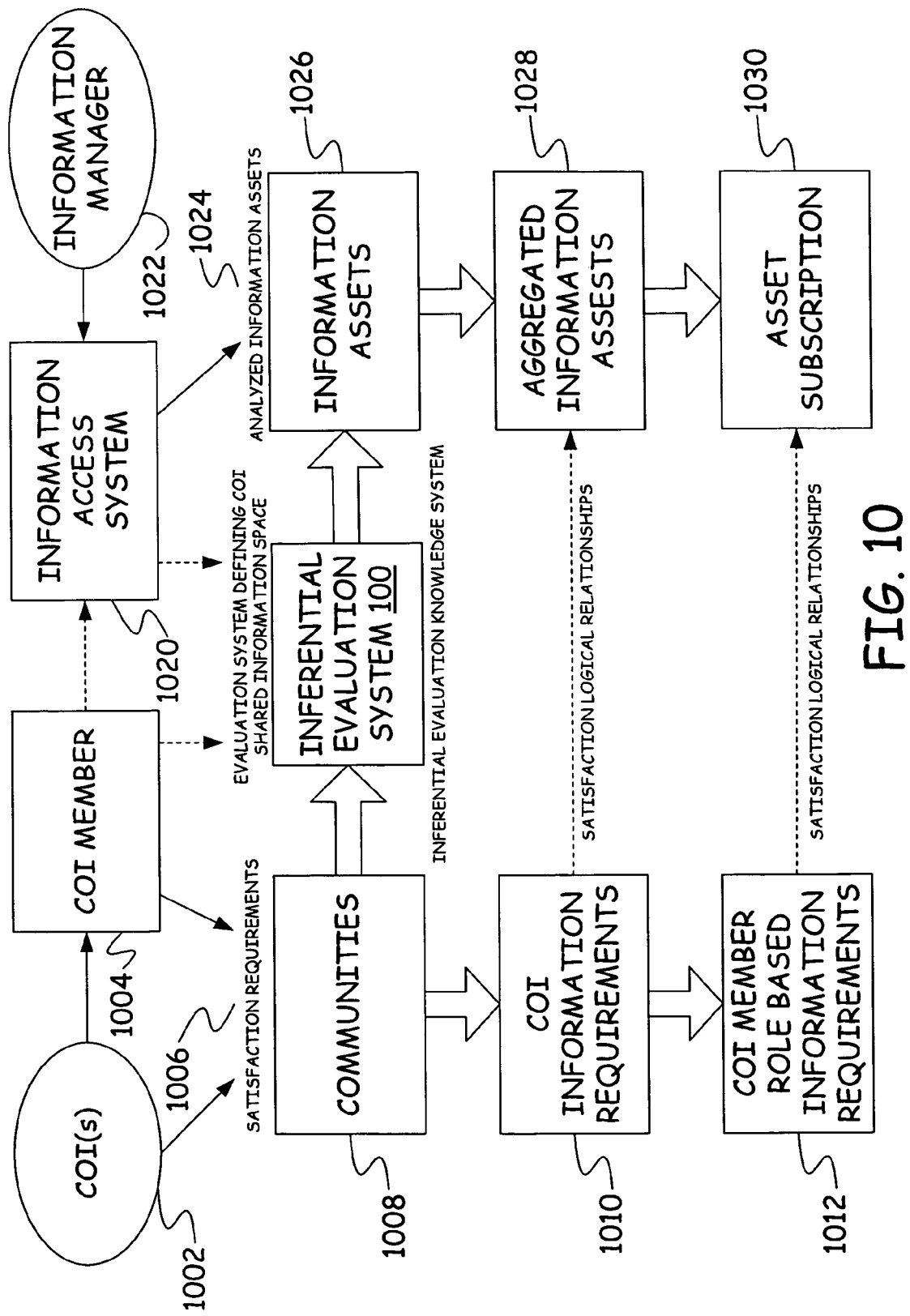
Figure 11:
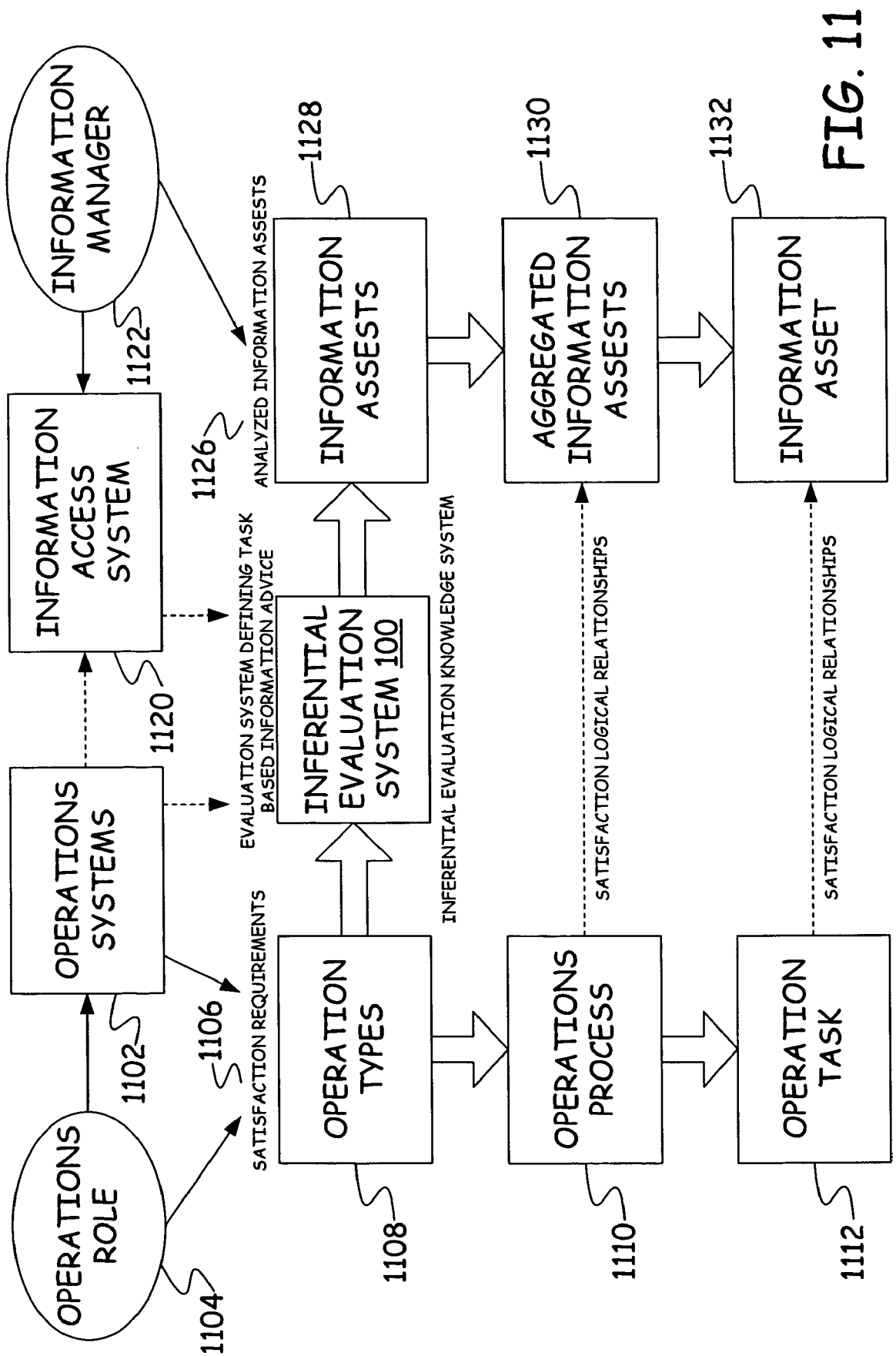

FIG. 8 is a block diagram illustrating a service oriented architecture satisfaction application of inferential evaluation system 100. On the left hand side are a requirements list 820 which represents a list of enterprise services that are necessary for the enterprise Although the subject matter has been described in language specific to structural features and/or methodological acts, it is to be understood that the subject matter defined in the appended claims is not necessarily limited to the specific features or acts described above but can be refined and specialized to the actual domain vocabulary of the requirements application domain and system capabilities descriptions. In this way the evaluation system 100, can translate between different vocabularies and language used for requirements and system capability descriptions. Rather, the specific features and acts described above are disclosed as example forms of implementing the claims.

What is claimed is:

1. An inferential evaluation system embodied in a computer for evaluating system capabilities relative to a set of requirements, the inferential evaluation system comprising:
a computer configured to implement inferential evaluation system components, comprising:
a requirements modeling component configured to be updated to model a set of requirements, the requirements modeling component including a requirements ontology model which defines the relationships among a set of requirements types in a hierarchical semantic dependency model and which uses the vocabulary of the requirements domain to refine and specialize the common requirements concepts and which has a knowledge base consistent with the ontology model to represent specific requirements facts;
a system descriptive modeling component configured to be updated to model a system description of a first system to be analyzed, the system descriptive modeling component including a system capabilities ontology model which defines the relationships among a set of system capability types or concepts, defined using the specific system description vocabulary refining the common system capabilities vocabulary, thus defining a model to capture the capabilities of the first system in a hierarchical semantic dependency model, and an associated knowledge base with specific system capability facts; and
an evaluation model component configured to relate the system description of the first system to requirements of the set of requirements to generate evaluation results in order to evaluate the capabilities of the first system to meet the set of requirements and to characterize the type of satisfaction achieved or not achieved, the evaluation model component including an evaluation ontology model which semantically links requirements of the set of requirements from the requirements ontology model and capabilities of the first system from the system capabilities ontology model, wherein the evaluation model component is configured to provide satisfaction classifications between requirements in the requirements ontology model and system capabilities in the system capabilities ontology model at an aspect hierarchical level, at an element hierarchical level and at an attribute hierarchical level:
the computer further configured to display on a display device, the evaluation results for use by a user in identifying whether the first system to be analyzed satisfies the set of requirements.

2. The inferential evaluation system of claim 1, wherein the evaluation ontology model is configured to semantically link requirements of the set of requirements from the requirements ontology model and capabilities of the first system from the system capabilities ontology model by identifying system attributes from the system capabilities ontology model related to requirement attributes from the requirements ontology model.

3. The inferential evaluation system of claim 1, and further comprising an evaluation service component configured to provide an interface of the inferential evaluation system with other systems in order to configure the requirements modeling component to be updated to model the set of requirements and to configure the system descriptive modeling component to be updated to model the system description of a first system to be analyzed.

4. The inferential evaluation system of claim 1 and further comprising an inference subsystem that can match semantic queries with the knowledge represented in the evaluation system ontologies or the evaluation system knowledge bases.

* * * * *